July 22, 1941.                    C. S. ZIGLER                    2,250,343
                                  BOLTED JOINT
                              Filed Feb. 18, 1938

Inventor
Carl S. Zigler

A. D. Adams
Attorney

Patented July 22, 1941

2,250,343

UNITED STATES PATENT OFFICE 2,250,343

BOLTED JOINT

Carl S. Zigler, Gladewater, Tex., assignor to William P. Lincoln, Shreveport, La., doing business as Lincoln Tank Company Application February 18, 1938, Serial No. 191,291

3 Claims. (Cl. 220—75)

This invention relates to bolted joints and, among other objects, aims to provide greatly improved bolts for making leakproof tank joints or seams. The main idea is to provide T bolts having arched or angular heads arranged to contact the inner wall of a tank at widely separated points, thereby providing three point bending contact with the outside and inside of the tank joint. Another aim is to provide in a bolt of this type a novel packing associated with the inside of the bolt head around the base of the stem adapted to be squeezed into the inside bolt hole positively to prevent leakage through slightly misaligned or battened holes which are enlarged by drift pins or other aligning tools. Another very important aim of the invention is to provide a bolted tank joint wherein adjacent bolt heads serve to prevent each other from turning within the tank while the nuts are being successively tightened or loosened, thus eliminating the necessity of employing the usual bolt head channel irons and greatly speeding up the work of assembling or dismantling oil storage tanks and the like.

Other aims and advantages of the invention will appear in the specification, when considered in connection with the accompanying drawing, wherein.

Figure 1:
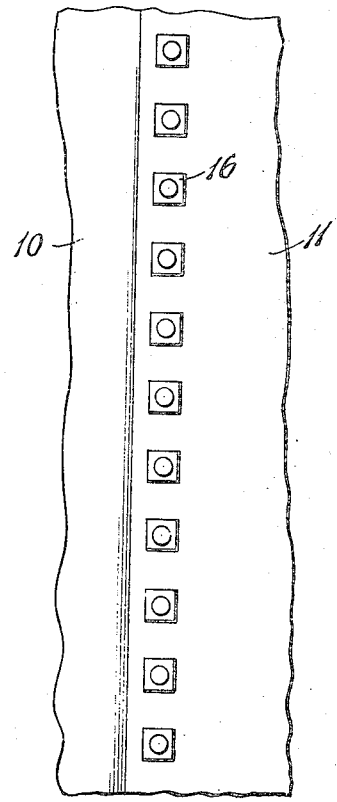
Fig. 1 is a fragmentary outside elevation of a bolted tank joint embodying the invention.

Heretofore, the joints of steel tanks such as are used in oil fields and other industries have generally consisted of overlapping sheets or staves bolted together with a packing strip between them. Ordinary half-inch machine bolts having square heads and nuts were used. To prevent the heads from turning when the nuts were tightened, the heads were set inside of a channel iron having holes to match the holes in the sheets, usually on two inch centers. The bolt holes are always slightly larger than the bolts. Hence, liquids would leak through the holes around the bolts, and such leakage would be greatly increased through misaligned holes enlarged by drift pins. The channel irons prevented the effective use of any packing under the bolt heads. This invention provides greatly improved bolted joints employing packing on the inside of the tank to prevent any leakage, eliminating the channel irons and greatly facilitating the erection of a tank.

Referring particularly to the drawing, there is shown a bolted tank joint having overlapping sheets 10 and 11 with the usual rubber packing strip 12 between them. The bolt holes 13 are drilled on the required centers.

Herein, the novel bolts are shown as having the usual threaded stem or pin 14 with a T-shaped head 15 which has a generally concave inner face. However, the bolts may have the ordinary slots to receive wedges instead of nuts. In this instance, the inner faces of the two arms or wings lie in planes at acute angles to the axis of the bolt so that their ends contact the inside sheet at widely spaced points. The heads thus have a small clearance at the center to permit them to bend when the nuts 16 are tightened. Moreover, the heads are arranged lengthwise along the joint and have only a small clearance so that one will serve to prevent another from turning when the nuts are tightened or loosened as shown in Figs. 2 and 3.

Figure 2:
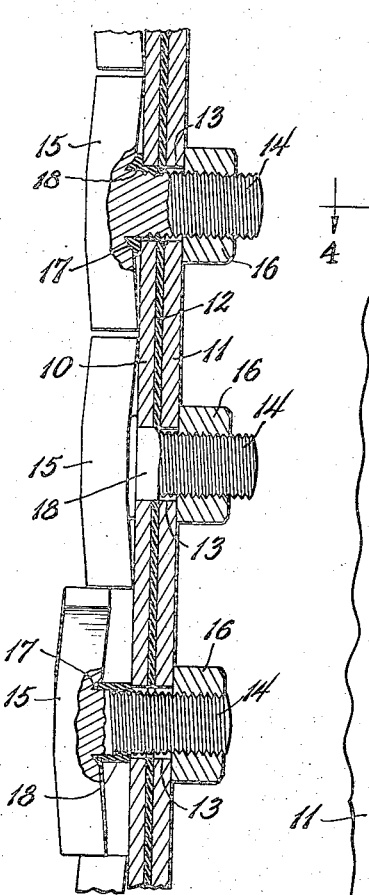
Fig. 2 is a full size vertical sectional view through the joint.
Figure 3:
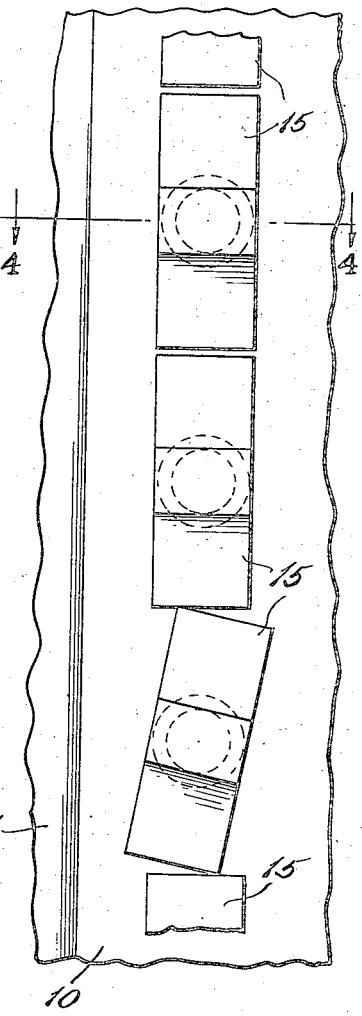
Fig. 3 is a full size fragmentary inside elevation of the joint.
Figure 4:
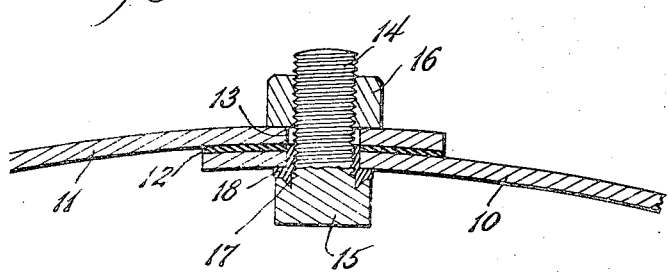
Fig. 4 is a sectional view taken on the line 4—4 of Fig. 3.

As shown in Figs. 2 and 4, the inside of each head is provided with an annular V-shaped groove 17 around the shank of the bolt to receive and compress a packing in the form of a fiber, rubber or lead sleeve 18 closely fitting the bolt shank and having an outside diameter slightly larger than the bolt hole. The construction is such that, as the nut is tightened, the head forces a portion of the sleeve into the hole and then crushes the head end of it, squeezing and spreading it laterally around the hole against the inside wall as well as against the bolt threads. This provides a very effective seal for the hole on the inside. The sealing sleeves may be and preferably are pre-assembled on the bolts and will be held in place by friction.

From the foregoing description, it will be seen that the improved joints are far superior to the ordinary bolted joints now in common use. The novel bolts eliminate the need for the usual channel irons which necessitate aligning three holes instead of two holes. They make it possible to use fewer bolts by spacing them further apart because each bolt has a three point bearing on the walls. They insure leakproof joints and make tighter joints with less pressure or shearing strain on the bolt threads. The bolts have a greater salvage value because the packing will hold them in their holes after the nuts are removed. The large heads enable them to be found very readily when they are dropped. The shape of the heads and their arrangement prevents them from turning relative to each other. Moreover, they are well adapted to be used with wedges instead of nuts and the spring action of the heads will prevent them from loosening due to vibrations of machinery. Also, their use speeds up the work of erection and dismantling.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In a bolted lap joint for metal tanks and the like, sheets having aligned openings; T-bolts in said openings having rigid, elongated integral, substantially rectangular heads at one end with longitudinally concave faces engaging the sheet on the inside of the tank, the other ends of the bolts having screw threaded engagement with clamping nuts; each of said heads having an annular V-shaped groove around the bolt shank; and cylindrical packing sleeves frictionally mounted on the bolt shanks and extending into said grooves and adapted to be compressed into sealing engagement with the bolt shanks and the bolt holes when the nuts on the bolts are tightened.

2. In a tank joint of the character described, overlapping sheets having aligned bolt holes; T-bolts in said openings having rigid, elongated, integral, substantially rectangular heads at one end with longitudinally concave faces engaging the sheet on the inside of the tank, the other ends of the bolts having screw threaded engagement with clamping nuts; said bolt heads being arranged lengthwise along the joint in substantially abutting relation to prevent relative turning; and packing sleeves on the bolt shanks crushed and squeezed into sealing engagement with the bolt shanks and the bolt holes in the inside sheet when the nuts on the bolts are tightened.

3. In a tank joint of the character described, overlapping sheets having aligned bolt holes; T-bolts in said openings having rigid, elongated, integral, substantially rectangular heads at one end with longitudinally concave faces engaging the sheet on the inside of the tank; and means on the outside of the tank contacting the outside sheet and coacting with the bolt to clamp said overlapping sheets together, said bolt heads being arranged lengthwise along the joint in substantially abutting relation to prevent relative turning.

CARL S. ZIGLER.